United States Patent
Mate et al.

(10) Patent No.: US 7,218,478 B2
(45) Date of Patent: May 15, 2007

(54) DISK DRIVE WITH NEGATIVE-PITCH SLIDER HAVING PROTRUSION PAD CONTACTING THE DISK WHEN THE DISK IS ROTATING AT OPERATING SPEED

(75) Inventors: Charles Mathew Mate, San Jose, CA (US); Robert N. Payne, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 396 days.

(21) Appl. No.: 10/953,717

(22) Filed: Sep. 28, 2004

(65) Prior Publication Data

US 2006/0067002 A1 Mar. 30, 2006

(51) Int. Cl.
*G11B 5/60* (2006.01)
(52) U.S. Cl. .................................... 360/237.1
(58) Field of Classification Search ............. 360/237.1
See application file for complete search history.

(56) References Cited

U.S. PATENT DOCUMENTS

| | | | |
|---|---|---|---|
| 4,761,699 A * | 8/1988 | Ainslie et al. | ........... 360/234.5 |
| 6,157,519 A | 12/2000 | Kohira et al. | |
| 6,751,063 B2 | 6/2004 | Payne et al. | |
| 6,762,909 B2 | 7/2004 | Albrecht et al. | |
| 6,920,019 B2 * | 7/2005 | Martin et al. | ................ 360/245 |

OTHER PUBLICATIONS

J. Itoh, et al., "An Experimental Investigation for Continuous-contact Recording Technology," IEEE Trans. on Magnetics, vol. 37, No. 4 Jul. 2001, p. 1806.
C.M. Mate et al., "Dynamics of Contacting Head-Disk Interfaces", IEEE Trans. Magn. 40 (2004) 3156-3158.

* cited by examiner

*Primary Examiner*—A. J. Heinz
(74) *Attorney, Agent, or Firm*—Thomas R. Berthold

(57) ABSTRACT

A magnetic recording disk drive has a negative-pitch slider in near-contact or continuous-contact with the disk during reading and writing of data. When the disk is rotating at its operating speed, the slider has its upstream or leading portion located closer to the disk surface than its downstream or trailing portion. Both the leading and trailing portions have air-bearing surfaces that enable the slider to be partially supported above the disk surface. A contact pad that provides no substantial air-bearing support is located at the leading portion and supports or contains the magnetic elements of the read/write head. The contact pad protrudes beyond the air-bearing surface of the leading portion and is in contact with the disk. For near-contact recording the contact pad partially wears away during an initial wear-in period. For continuous-contact recording the contact pad is wear-resistant and remains in substantially continuous contact with the disk during reading and writing of data.

14 Claims, 5 Drawing Sheets

NEGATIVE-PITCH SLIDER

DISK DRIVE WITH NEGATIVE-PITCH SLIDER HAVING PROTRUSION PAD CONTACTING THE DISK WHEN THE DISK IS ROTATING AT OPERATING SPEED

BACKGROUND OF THE INVENTION

1. Field of the Invention

This invention relates in general to magnetic recording disk drives and in particular to a magnetic recording disk drive that uses an air-bearing slider for contact recording.

2. Description of the Related Art

In conventional magnetic recording rigid disk drives, each of the read/write transducers (or heads) is supported on an air-bearing slider that rides on a cushion or bearing of air above the surface of its associated disk surface when the disk is rotating at its operating speed. The slider is connected to an actuator by means of a relatively fragile suspension. The suspension includes a gimbal or flexure that supports the slider and allows it to pitch and roll and a load beam with a dimple or tip that applies a small load force at a slider pivot point. The suspension thus applies a load force and a moment about the pivot point to bias the slider toward the disk surface. The slider has an air-bearing surface (ABS) designed to generate an air-bearing force to counteract the bias force from the load beam and thus assure that the slider "flies" above and out of contact with the disk surface.

More recently, continuous-contact recording has been proposed that uses a head carrier in the form of a slider with an ABS that only partially supports the slider above the disk surface, with a rear or trailing portion of the slider that supports the head and remains in contact with the disk surface during reading and writing of data. The interface between this type of continuous-contact slider and the disk has been investigated by J. Itoh, et al., "An Experimental Investigation for Continuous-contact Recording Technology," *IEEE Trans. on Magnetics*, vol. 37, No. 4 Jul. 2001, p. 1806. Continuous-contact recording head-suspension assemblies are described in U.S. Pat. No. 6,157,519.

In addition to continuous-contact recording, near-contact recording has been proposed. In near-contact recording the slider or a portion of the slider is in contact with the rotating disk during an initial wear-in period. After a certain amount of wear has occurred the slider then flies with a very small clearance. In near-contact recording, the slider will be in contact with the rotating disk during a significant portion of the time the disk is at its operating speed. U.S. Pat. No. 6,762,909 B2 describes a slider for near-contact recording that has a protrusion pad on its trailing portion that supports the head and partially wears away after an initial wear-in period.

In both continuous-contact and near-contact recording, as well as in conventional non-contact recording, the slider has a positive "pitch" when the disk is rotating at its operating speed. Positive pitch means that the leading portion of the slider, i.e., the "upstream" portion facing the air flow induced by the rotating disk, is farther from the disk surface than the "downstream" or trailing portion. The read/write head is located on the trailing portion, usually on the rear or trailing surface of the slider, so that it is located close to the disk surface.

A serious problem encountered in contact recording is bounce of the slider caused by friction between the slider and the rotating disk, as described by C. M. Mate et al., "Dynamics of Contacting Head-Disk Interfaces", *IEEE Trans. on Magnetics*, vol. 40 (2004) pp. 3156-3158. Several approaches have been shown to work for reducing bounce, but all of them are generally unacceptable. For example, increasing the disk surface roughness increases the magnetic spacing between the head and the recording medium by an unacceptable amount, texturing of the ABS adds more processing steps and can damage the head, and decreasing the mobility of the liquid lubricant on the disk surface can lead to poor durability of the slider-disk interface. The positive pitch slider contributes to the bounce problem because the friction force on the slider is at the downstream or trailing end and thus applies a moment about the slider pivot point that tends to lift the trailing end of the slider off the disk.

Negative-pitch sliders have been proposed for non-contact recording. A negative-pitch slider has at least one point in the leading portion of the slider closer to the disk than any point in the trailing portion of the slider when the disk is rotating at its operating speed. The negative-pitch slider has been shown to have advantages in non-contact recording because of reduced fly height sensitivity to variations in ambient pressure and radial position on the disk. U.S. Pat. No. 6,751,063 B2 describes a non-contact recording disk drive with a negative-pitch slider.

What is needed is a contact recording disk drive that minimizes the problem of slider bounce.

SUMMARY OF THE INVENTION

The invention is a magnetic recording disk drive that uses a negative-pitch slider in near-contact or continuous-contact with the disk during reading and writing of data. When the disk is rotating at its operating speed, the slider has its upstream or leading portion located closer to the disk surface than its downstream or trailing portion. Both the leading and trailing portions have air-bearing surfaces that enable the slider to be partially supported above the disk surface. A contact pad that provides no substantial air-bearing support is located at the leading portion and supports or contains the magnetic elements of the read/write head. The contact pad protrudes beyond the air-bearing surface of the leading portion and is in contact with the disk. For near-contact recording the contact pad partially wears away during an initial wear-in period. For continuous-contact recording the contact pad is wear-resistant and remains in substantially continuous contact with the disk during reading and writing of data.

The contact recording negative-pitch slider makes contact with the disk upstream of the pivot point, which allows the friction force applied to the slider from the rotating disk to generate a moment about the pivot point that tends to urge the contact pad toward the disk surface, thereby minimizing slider bounce. From acoustic-emission (AE) measurements of the slider-disk interface, which have been correlated with slider bounce, the contact recording negative-pitch slider has been shown to provide an order of magnitude reduction of AE over a negative-pitch slider without a contact pad.

For a fuller understanding of the nature and advantages of the present invention, reference should be made to the following detailed description taken together with the accompanying figures.

DETAILED DESCRIPTION OF THE INVENTION

Figure 1:
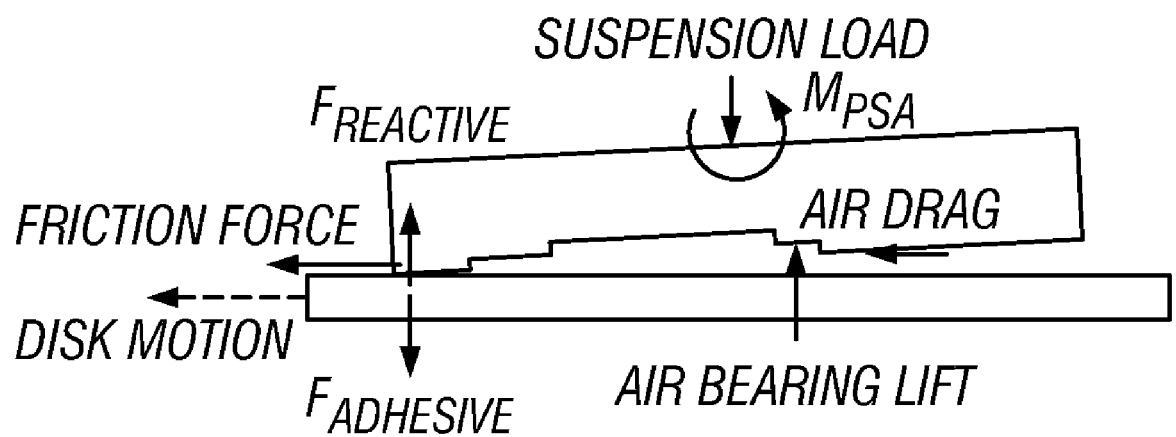
FIG. 1 is a side view of a positive-pitch slider in contact with a rotating disk and illustrates the problem of slider bounce.

FIG. 1 is a side view of a positive-pitch slider in contact with a rotating disk. The suspension applies a load force and a moment $M_{PSA}$, called the "pitch static attitude" moment, to the top side of the slider at the pivot point. Both the suspension load force and $M_{PSA}$ tend to urge the trailing portion of the slider into contact with the disk. The leading portion of the slider is raised above the disk due to the air-bearing lift acting on the ABS. The friction force acting on the slider at the trailing portion, due to the contact between the slider trailing portion and the rotating disk, generates a moment about the pivot point that is opposite to $M_{PSA}$. This moment tends to urge the trailing portion of the slider off the disk, and thus contributes to slider bounce. FIG. 1 represents a conventional slider.

Figure 2A:
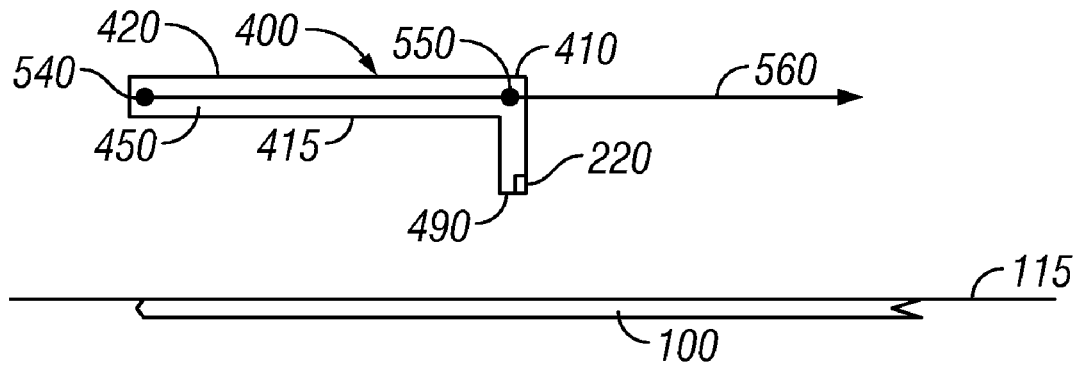
FIGS. 2A and 2B depict a very simplified negative-pitch slider and its orientation relative to the disk without air flow and with air flow, respectively.
Figure 2B:
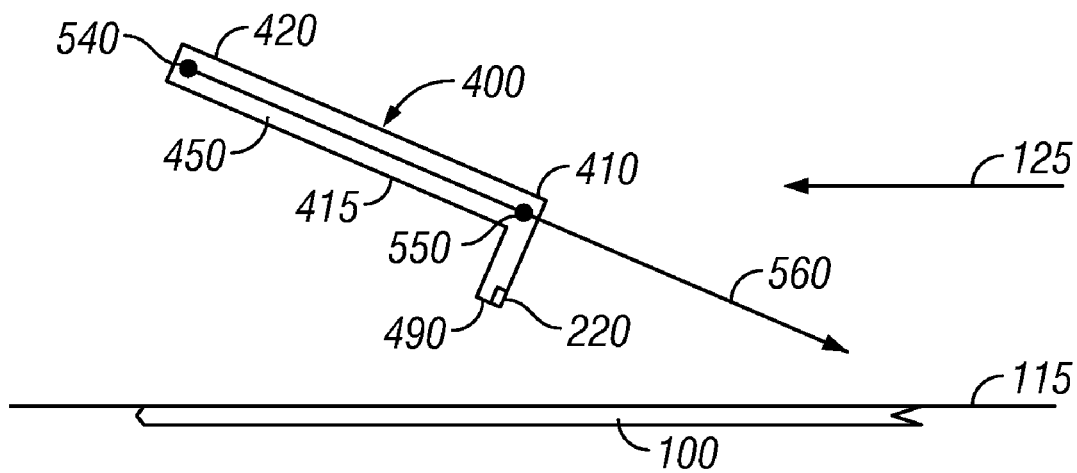

FIGS. 2A and 2B depict a very simplified negative-pitch slider 400 for non-contact recording. FIG. 2A illustrates the orientation of the slider 400 relative to the disk 100 without flow, and FIG. 2B illustrates it with flow 125. The slider 400 has a leading portion 410 and a trailing portion 420, the leading portion 410 being upstream of the trailing portion 420 in the presence of the flow 125. The slider 400 has a base 450 and an air-bearing surface or pad 490 on the leading portion 410. A magnetic recording head 220 is located near the pad 490. The base 450 has a disk-facing side 415 that faces the disk 100. The slider 400 is oriented such that at least one point in the leading portion 410 of the slider 400 is closer to the disk 100 than any point in the trailing portion 420 when the disk is rotating at its operating speed. This orientation can be described with the use of a ray 560 that extends from a first point 540 in the trailing portion 420 through a second point 550 in the leading portion 410. The points are selected such that in the absence of flow, the ray 560 is generally parallel to the disk plane 115 that is defined by the surface of the disk 100, as shown in FIG. 2A. The angle of the pitch of the slider 400 relative to the disk 100 shown in FIG. 2B is depicted sufficiently steep to illustrate the ray 560 intersecting the disk plane 115. The pitch angle is generally so small, for example less than a few hundredths of a degree, that the ray 560 will intersect the disk plane 115 outside that encompassed by the physical disk 100.

Figure 3:
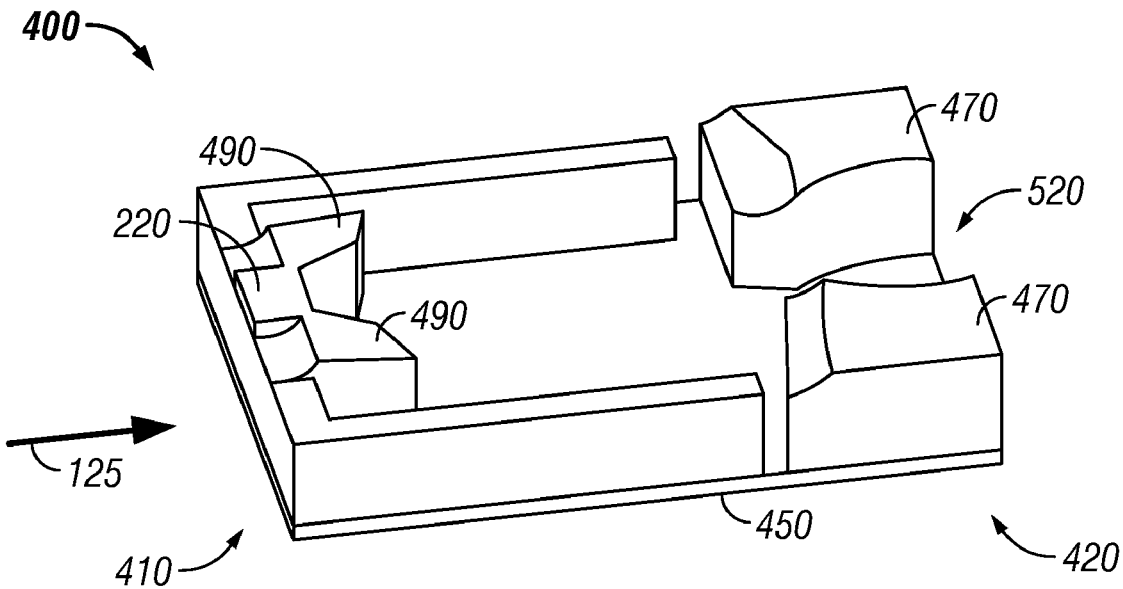
FIG. 3 is a perspective view a negative-pitch slider showing the side of the slider that faces the disk.

FIG. 3 is a perspective view of the non-contact recording negative-pitch slider 400 showing the side that faces the disk. The slider 400 has an air-bearing surface or pad 490 in the leading portion 410 and two air-bearing surfaces or pads 470 in the trailing portion 420. The leading-portion surface 490 and the two trailing-portion surfaces 470 are typically formed at the same time and designed to lie in substantially the same plane. A trailing-portion outflow region 520 between the two trailing-portion pads 470 allows air flow to escape the confines of the slider 400. The trailing-portion pads 470 have a substantially larger surface area than leading-portion pad 490 so that the air flow lifts the trailing portion 420 more than the leading portion 410. When the disk is rotating at its operating speed, both the leading and trailing portions 410, 420 are maintained out of contact with the rotating disk. Air flows in the direction of arrow 125 and generates an air-bearing on both the leading-portion air-bearing surface 490 and the trailing portion air-bearing surfaces 490, causing a negative pitch attitude for the slider with the upstream or leading portion 410 that contains head 220 being located closer to the disk than the downstream or trailing portion 420.

Figure 4:
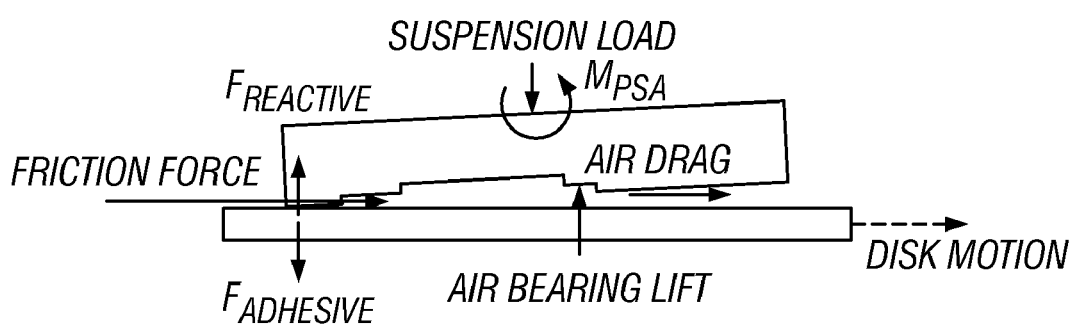
FIG. 4 is a side view of the negative-pitch slider in contact with a rotating disk and illustrates the advantage of the present invention over the contact recording positive-pitch slider depicted in FIG. 1.

The invention is a contact recording disk drive that uses a negative-pitch slider with a contact pad or protrusion pad that extends beyond the leading-portion air-bearing surface and is in contact with the disk when the disk is rotating at its operating speed. FIG. 4 is a side view of the negative-pitch slider in contact with a rotating disk and illustrates the advantage of the invention over the contact recording positive-pitch slider depicted in FIG. 1. The suspension applies a load force and a moment $M_{PSA}$, called the "pitch static attitude" moment, to the top side of the slider at the pivot point. Both the suspension load force and $M_{PSA}$ (if the moment is oriented counter-clockwise as shown in FIG. 4) tend to urge the leading portion of the slider, i.e., that portion that faces the air flow, into contact with the disk. If $M_{PSA}$ is oriented clockwise, the ABS should be designed with a suitable negative pressure pocket to generate a moment to counter $M_{PSA}$ and urge the leading portion of the slider into contact with the disk. The downstream or trailing portion of the slider is raised above the disk due to the air-bearing lift acting on the ABS. However, unlike the positive-pitch slider in FIG. 1, the friction force acting on the slider at the leading portion, due to the contact between the slider leading portion and the rotating disk, generates a counter-clockwise moment about the pivot point. This moment tends to urge the leading portion of the slider toward the disk, thus minimizing slider bounce.

The invention is a contact recording disk drive that uses a negative-pitch slider with a contact pad or protrusion pad that extends beyond the leading-portion air-bearing surface and is in contact with the disk when the disk is rotating at its operating speed. FIG. 4 is a side view of the negative-pitch slider in contact with a rotating disk and illustrates the advantage of the invention over the contact recording positive-pitch slider depicted in FIG. 1. The suspension applies a load force and a moment $M_{PSA}$, called the "pitch static attitude" moment, to the top side of the slider at the pivot point. Both the suspension load force and $M_{PSA}$ (or the moment generated by the force from the negative-pressure pocket if the slider is a negative-pressure slider) tend to urge the leading portion of the slider, i.e., that portion that faces the air flow, into contact with the disk. The downstream or trailing portion of the slider is raised above the disk due to the air-bearing lift acting on the ABS. However, unlike the positive-pitch slider in FIG. 1, the friction force acting on the slider at the leading portion, due to the contact between the slider leading portion and the rotating disk, generates a moment about the pivot point that is in the same direction as $M_{PSA}$. This moment tends to urge the leading portion of the slider toward the disk, thus minimizing slider bounce.

Figure 5:
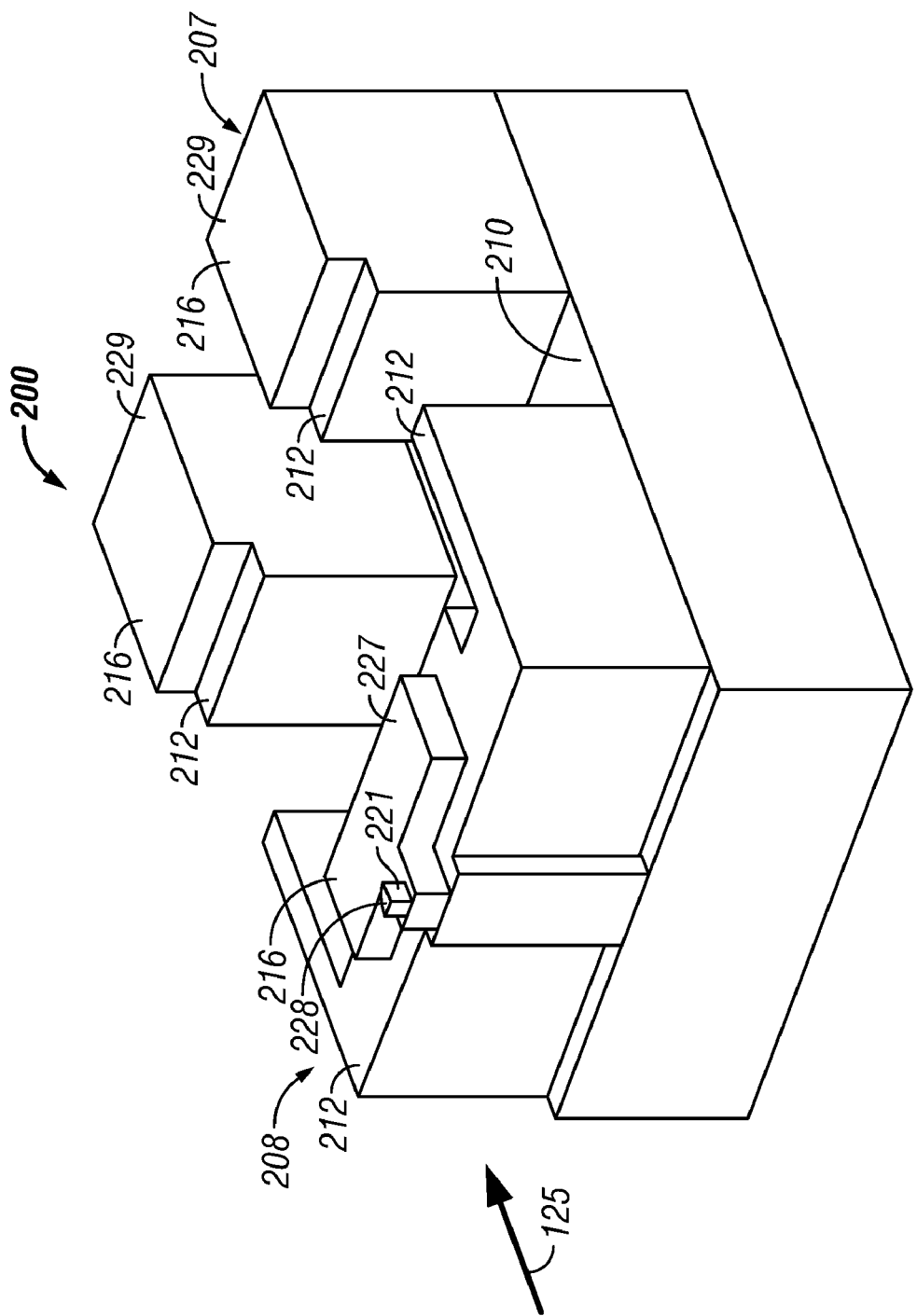
FIG. 5 shows the contact recording negative-pitch slider of the present invention oriented relative to the direction of air flow.

FIG. 5 shows the contact recording negative-pitch slider 200 used in the disk drive of the present invention and oriented relative to the direction of air flow 125. A conventional slider design starts off with a flat polished surface from which a patterned air-bearing surface (ABS) is created by a removal process such as etching or ion milling. The slider 200 has a rear or trailing portion 207 and a front or leading portion 208 and is formed using a dual etch with three surface levels 210, 212, 216. The surface 216 is the ABS and includes front air-bearing pad 227 and rear air-bearing pads 229. While two read pads 229 are shown, the slider may have only a single rear pad on the trailing portion. A third etch is then performed to produce a fourth surface level 228. The depth of the third etch produces the contact or protrusion pad 221 on surface 216. The top surface 228 is now the end of a small contact pad 221 that protrudes beyond the surface 216. A conventional slider, such as a "pico" slider, has length, width and height dimensions of 1.2 mm by 1.0 mm by 0.3 mm. For a slider of that size, the height of surface 216 above surface 212 is approximately 180 nm, and the height of surface 228 above surface 216 is approximately 10 nm.

The magnetic elements of the read/write head, i.e., the write head pole tips and the magnetoresistive read element, may be located within the contact pad 221 with their ends extending above surface 216. The magnetic elements may also be located on or in air-bearing pad 227 and not extend into contact pad 221. If the slider is for use in near-contact recording, the contact pad 221 may have an outer thin carbon overcoat that wears away when it comes into contact with the rotating disk. Alternatively, the contact pad 221 may be formed of wear-resistant material, such as diamond-like carbon or silicon nitride, or may have a layer of wear-resistant material deposited on its outer end, and designed to remain in continuous contact with the disk during reading and writing of data. The pad 221 protrudes beyond the surface 216 of front pad 227 and is small enough that surface 228 does not provide any significant air-bearing effect to the slider 200. If the negative-pitch slider is for near-contact recording it is made small enough so that it will wear quickly and easily and will not affect the fly height as it wears down, which provides the pad 221 with the ability to achieve essentially zero interference with the disk surface. surface 216 above surface 212 is approximately 180 nm, and the height of surface 220 above surface 216 is approximately 10 nm.

The magnetic elements of the read/write head, i.e., the write head pole tips and the magnetoresistive read element, may be located within the contact pad 221 with their ends extending above surface 216. The magnetic elements may also be located on or in air-bearing pad 227 and not extend into contact pad 221. If the slider is for use in near-contact recording, the contact pad 221 may have an outer thin carbon overcoat that wears away when it comes into contact with the rotating disk. Alternatively, the contact pad 221 may be formed of wear-resistant material, such as diamond-like carbon or silicon nitride, or may have a layer of wear-resistant material deposited on its outer end, and designed to remain in continuous contact with the disk during reading and writing of data. The pad 221 protrudes beyond the surface 216 of front pad 227 and is small enough that surface 220 does not provide any significant air-bearing effect to the slider 200. If the negative-pitch slider is for near-contact recording it is made small enough so that it will wear quickly and easily and will not affect the fly height as it wears down, which provides the pad 221 with the ability to achieve essentially zero interference with the disk surface.

The body of slider 200 is typically one or more materials such as alumina ($Al_2O_3$), $TiC/Al_2O_3$ composite, or silicon, which may also make up the pad 221. The surface area of the end of pad 221 is less than 5% of the total area of the ABS (the total areas of air-bearing pads 227, 229).

Figure 6:
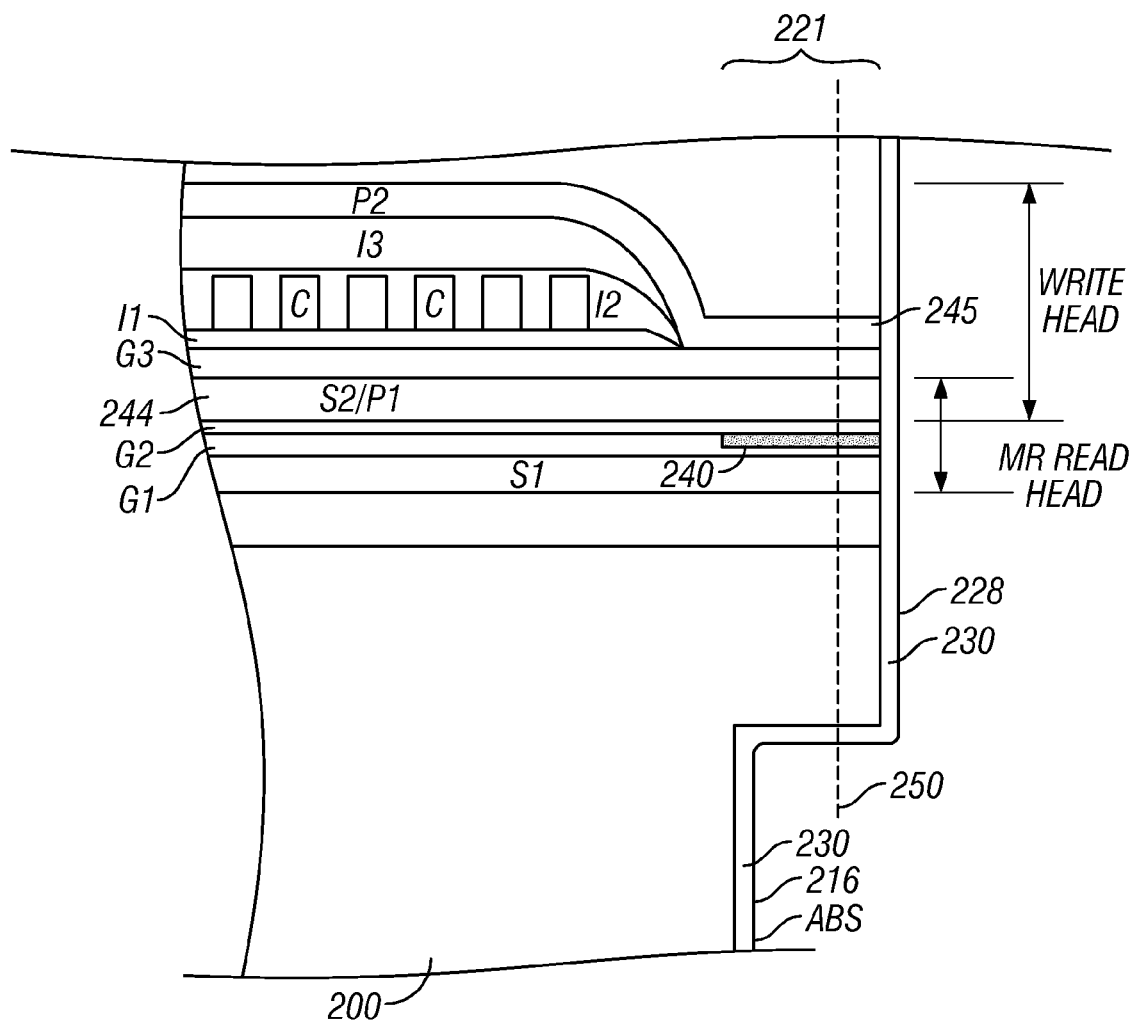
FIG. 6 is a cross-sectional schematic view of a near-contact recording embodiment of the negative-pitch slider showing the read/write head magnetic elements protruding into and surrounded by the material of the slider contact pad.

FIG. 6 is a cross-sectional schematic view of the read/write head which has its magnetic elements protruding into and surrounded by the material of protrusion pad 221 for a near-contact recording embodiment of the negative-pitch slider 200. The pad 221 protrudes beyond the surface 216, which is part of the ABS of slider 200. An overcoat, typically amorphous diamond-like carbon, is formed as a film 230 over the end of protrusion pad 221 and the ends of magnetic elements 240 and 244, 245. The read head includes a magnetoresistive (MR) sensing element 240 sandwiched between first and second gap layers G1 and G2 which are, in turn, sandwiched between first and second magnetic shield layers S1 and S2. The electrical conductors (not shown) that lead out from the MR sensing element 240 to connect with the sensing circuitry are in contact with the MR sensing element 240 and are located between element 240 and the gap layers G1, G2. The gap layers G1, G2 thus electrically insulate the electrical leads from the shields S1, S2. The write head includes a coil layer C and insulation layer 12 which are sandwiched between insulation layers I1 and I3 which are, in turn, sandwiched between first and second pole pieces P1 and P2. A gap layer G3 is sandwiched between the first and second pole pieces P1 (244), P2 (245) at their pole tips that are adjacent to the ABS for providing a write gap. During writing, signal current is conducted through the coil layer C and flux is induced into the first and second poles 244, 245 causing flux to fringe across the pole tips. During reading, magnetized regions on the rotating disk inject flux into the MR sensing element 240, causing resistance changes in the MR sensing element that are detected as voltage changes. The read/write head shown in FIG. 6 is called a "merged" head because the second shield layer S2 of the read head is employed as a first pole piece P1 for the write head. In a "piggyback" read/write head (not shown), the second shield layer S2 and the first pole piece P1 are separate layers.

In the disk drive of the present invention, the slider 200 flies at a fly height that will put the pad 221 with its outer carbon overcoat 230 in contact with the rotating disk. During an initial wear-in period, when the disk is rotated the pad 221 will interfere with the disk surface, which is typically formed of amorphous carbon, and wear down to the level indicated by dashed line 250. When this level is reached, the wear will be self-limiting and not continue further because of the support provided by the ABS (surface 216). As shown in FIG. 6 when wear point 250 is reached the overcoat 230 will be completely removed from pad 221, thereby exposing the magnetic elements, i.e., the end of MR sensing element 240 and the ends of poles 244, 245. The overcoat can be made thicker so that a portion of the overcoat remains after the wear-in period. After the wear-in period, there will be a small, well-defined clearance between the magnetic elements and the disk. The result is a head/disk interface with a small or zero physical spacing to provide a very small magnetic spacing between the read/write elements and the magnetic recording layer on the disk.

In FIG. 6, the ends of the magnetic elements 240, 244, 245 are depicted as extending into the protrusion pad 221 and beyond the surface 216. However, the ends of the magnetic elements may be located at or below the surface 216. This allows more of the protrusion pad 221 to function as a contact pad, which may be desirable when the negative-pitch slider is intended for continuous-contact recording. When the pad 221 remains in continuous contact with the disk over the life of the disk drive it would be desirable to have the ends of the magnetic elements recessed from the outer surface of the contact pad.

To determine the potential reduction in slider bounce for the negative-pitch slider of this invention, friction force and acoustic-emission (AE) measurements were made at a disk velocity of 8 m/s for the slider substantially as shown in FIG. 5 and for a slider substantially identical to that shown in FIG. 5 but without the contact pad. High AE from the slider-disk interface during operation of a contact recording disk drive has been correlated with high probability of slider bounce. For the negative-pitch slider without the contact pad, the AE was approximately 10 times higher and the friction force was approximately 3 times higher than for the slider with the contact pad.

The invention has been described for a disk drive that operates in air. However, disk drives have been proposed wherein the head-disk interface is exposed to other gaseous environments, such as nitrogen and helium. Thus the negative-pitch slider of the present invention is fully operable when the gas is other than air.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk drive comprising:
   a rotatable magnetic recording disk;
   a slider for supporting a magnetic recording head and comprising (a) a leading portion exposed to gas flow induced by the rotating disk and having a gas-bearing surface, (b) a trailing portion downstream from the leading portion and having a gas-bearing surface substantially coplanar with the gas-bearing surface of said leading portion, and (c) a protrusion pad on the leading portion, wherein the leading-portion of the slider is closer to the disk than the trailing portion of the slider, the protrusion pad is closer to the disk than the gas-bearing surface of said leading portion and is in contact with the disk when the disk is rotating at operating speed;
   a head on the slider leading portion for reading and writing data on the disk; and
   an actuator connected to the slider for moving the slider and head across the disk when the disk is rotating.

2. The disk drive of claim 1 wherein the head is on the protrusion pad and includes a magnetoresistive read element having an end facing the disk for reading data and write poles having ends facing the disk for writing data, the ends of the read element and write poles being closer to the disk than the gas-bearing surface of said leading portion when the disk is rotating at operating speed.

3. The disk drive of claim 1 wherein the head includes a magnetoresistive read element for reading data and write poles for writing data, the ends of the read element and write poles extending no further than the gas-bearing surface of the slider leading portion.

4. The disk drive of claim 1 further comprising a protective coating on the end of the protrusion pad.

5. The disk drive of claim 4 wherein the gas-bearing surfaces on the leading and trailing portions maintain the protrusion pad in substantially continuous-contact with the disk during reading and writing of data.

6. The disk drive of claim 4 wherein the gas-bearing surfaces on the leading and trailing portions maintain the protrusion pad in contact with the disk during an initial wear-in period.

7. The disk drive of claim 6 wherein the gas-bearing surfaces on the leading and trailing portions maintain the protrusion pad in near-contact with the disk during reading and writing of data after the initial wear-in period.

8. The disk drive of claim 1 wherein the gas-bearing surface on the trailing portion of the slider comprises at least two gas-bearing pads.

9. The disk drive of claim 1 further comprising a suspension connecting the slider to the actuator and comprising a flexure attached to the top side of the slider and a load beam attached to the flexure and having a tip contacting the top side of the slider at a pivot point, the load beam applying a force to urge the protrusion pad to contact the disk when the disk is rotating; and wherein the friction force applied to the slider when the protrusion pad contacts the rotating disk applies a moment about the pivot point to urge the protrusion pad toward the disk.

10. A magnetic recording disk drive slider comprising:
    a leading portion for facing the gas flow when the slider is maintained near the surface of a rotating magnetic recording disk, the leading portion having a gas-bearing surface that faces the disk when the slider is maintained near the surface of a rotating magnetic recording disk;
    a trailing portion downstream from the leading portion and having a gas-bearing surface that faces the disk when the slider is maintained near the surface of a rotating magnetic recording disk, the trailing portion gas-bearing surface being substantially larger than and substantially coplanar with the leading portion gas-bearing surface;
    a contact pad on the leading portion for contacting the disk when the disk is rotating, the contact pad being closer to the disk than the gas-bearing surface of the leading portion when the disk is rotating; and
    a read/write head on the leading portion near the contact pad.

11. The slider of claim 10 wherein the head includes a magnetoresistive read element having an end and write poles having ends, said read element end and write pole ends being closer to the disk than the gas-bearing surface of said leading portion when the disk is rotating.

12. The slider of claim 10 wherein the head includes a magnetoresistive read element and write poles having ends that extend no further than the gas-bearing surface of the leading portion.

13. The slider of claim 10 further comprising a protective coating on the end of the contact pad.

14. The slider of claim 10 wherein the gas-bearing surface on the trailing portion comprises at least two gas-bearing pads.

* * * * *